(12) United States Patent
Ishibashi

(10) Patent No.: US 10,479,142 B2
(45) Date of Patent: Nov. 19, 2019

(54) PNEUMATIC TIRE

(71) Applicant: Sumitomo Rubber Industries, Ltd., Kobe-shi, Hyogo (JP)

(72) Inventor: Takashi Ishibashi, Kobe (JP)

(73) Assignee: SUMITOMO RUBBER INDUSTRIES, LTD., Kobe-shi, Hyogo (JP)

(*) Notice: Subject to any disclaimer, the term of this patent is extended or adjusted under 35 U.S.C. 154(b) by 240 days.

(21) Appl. No.: 15/380,091

(22) Filed: Dec. 15, 2016

(65) Prior Publication Data
US 2017/0190220 A1   Jul. 6, 2017

(30) Foreign Application Priority Data

Jan. 6, 2016 (JP) ................................ 2016-001119

(51) Int. Cl.
*B60C 11/04* (2006.01)
*B60C 11/03* (2006.01)

(52) U.S. Cl.
CPC ........ *B60C 11/045* (2013.01); *B60C 11/0302* (2013.01); *B60C 2011/0355* (2013.01)

(58) Field of Classification Search
CPC ......... B60C 11/0302; B60C 2011/0346; B60C 11/1384; B60C 2011/0374
See application file for complete search history.

(56) References Cited

U.S. PATENT DOCUMENTS

| 4,166,490 | A | * | 9/1979 | Poque | B60C 11/0306 |
| | | | | | 152/209.1 |
| 4,854,358 | A | * | 8/1989 | Takeuchi | B60C 11/00 |
| | | | | | 152/209.18 |
| 6,003,574 | A | * | 12/1999 | Boiocchi | B60C 11/03 |
| | | | | | 152/209.1 |
| 6,571,844 | B1 | * | 6/2003 | Ochi | B60C 11/11 |
| | | | | | 152/209.18 |
| 9,085,202 | B2 | * | 7/2015 | Haga | B60C 11/0306 |
| 9,731,560 | B2 | * | 8/2017 | Takano | B60C 11/1392 |

(Continued)

FOREIGN PATENT DOCUMENTS

| JP | 64-18707 A | 1/1989 |
| JP | 2007-238060 A | 9/2007 |
| JP | 2010-215075 A | 9/2010 |

*Primary Examiner* — Jodi C Franklin
(74) *Attorney, Agent, or Firm* — Birch, Stewart, Kolasch & Birch, LLP

(57) ABSTRACT

A pneumatic tire is provided in the tread portion with zigzag middle main grooves 4 and shoulder main grooves 5 to define middle land regions 7 therebetween. The middle main groove is composed of alternately-arranged, oppositely-inclined long first oblique segments 11 and short second oblique segments 12. The middle land regions are provided with middle transverse grooves 20 shallower than the middle main grooves. The first oblique segments are inclined axially outwardly toward the opposite direction to the intended tire rotational direction R. The middle transverse grooves are inclined to the same direction as the first oblique segments or in parallel with the tire axial direction. The axially inner end of each of the middle transverse grooves is connected to one of the second oblique segments so as to include at least a part of an axially outwardly protruding outside corner portion 4A of the middle main groove.

14 Claims, 6 Drawing Sheets

(56) References Cited

U.S. PATENT DOCUMENTS

| | | | | |
|---|---|---|---|---|
| 2001/0035245 A1* | 11/2001 | Ikeda | ............... | B60C 11/0309 |
| | | | | 152/209.24 |
| 2006/0118222 A1* | 6/2006 | Ebiko | ............... | B60C 11/0302 |
| | | | | 152/209.28 |
| 2008/0196808 A1* | 8/2008 | Ikeda | ............... | B60C 11/0306 |
| | | | | 152/209.24 |
| 2008/0202658 A1* | 8/2008 | Ikeda | ............... | B60C 11/0306 |
| | | | | 152/209.23 |
| 2010/0101695 A1* | 4/2010 | Ueda | ............... | B60C 11/0302 |
| | | | | 152/209.15 |
| 2010/0139826 A1* | 6/2010 | Matsumoto | ......... | B60C 11/0309 |
| | | | | 152/209.18 |
| 2010/0206446 A1* | 8/2010 | Oizumi | ............... | B60C 11/0306 |
| | | | | 152/209.18 |
| 2010/0252158 A1* | 10/2010 | Haga | ............... | B60C 11/0306 |
| | | | | 152/209.18 |
| 2010/0314012 A1* | 12/2010 | Hada | ............... | B60C 11/0306 |
| | | | | 152/209.16 |
| 2011/0073230 A1 | 3/2011 | Ishiguro et al. | | |
| 2011/0308680 A1* | 12/2011 | Numata | ............. | B60C 11/1625 |
| | | | | 152/209.17 |
| 2012/0273108 A1* | 11/2012 | Yoshida | ............... | B60C 11/12 |
| | | | | 152/209.25 |
| 2013/0192730 A1* | 8/2013 | Morozumi | ............... | B60C 9/00 |
| | | | | 152/209.1 |
| 2013/0263988 A1* | 10/2013 | Minoli | ............... | B60C 11/0316 |
| | | | | 152/209.19 |
| 2014/0261937 A1* | 9/2014 | Fujita | ............... | B60C 11/11 |
| | | | | 152/209.18 |
| 2016/0152091 A1* | 6/2016 | Yoshida | ............... | B60C 11/11 |
| | | | | 152/209.18 |
| 2016/0221397 A1* | 8/2016 | Maehara | ............... | B60C 11/0306 |
| 2017/0144488 A1* | 5/2017 | Tanaka | ............... | B60C 11/0304 |
| 2017/0225514 A1* | 8/2017 | Iwata | ............... | B60C 11/0306 |

* cited by examiner

PNEUMATIC TIRE

BACKGROUND OF THE INVENTION

The present invention relates to a pneumatic tire, more particularly to a rain tire suitable for running on wet roads at high speed in motor sports.

There has been known a pneumatic tire provided in its tread portion with main grooves with a large width and depth (i.e. a large groove volume) for the purpose of improving the drainage performance on wet roads. However, in the tread portion, if the groove volume is increased, the ground contacting area is decreased and the rigidity of the tread portion in its land regions is lowered, therefore, there has been a problem that the steering stability on dry roads is deteriorated. Especially in motor sports, it is important for a rain tire, which is intended for running on a wet road surface at high speed, to improve the steering stability to a higher level while maintaining the wet performance.

PRIOR ART DOCUMENTS

Japanese Patent Application Publication No. S64-18707
Japanese Patent Application Publication No. 2007-238060
Japanese Patent Application Publication No. 2010-215075

SUMMARY OF THE INVENTION

The present invention was made in view of the above, and a primary object thereof is to provide a pneumatic tire, in particular a racing rain tire in which, by improving configuration of junctions of middle transverse grooves with a zigzag middle main groove, the steering stability can be improved to a higher level while maintaining the wet performance.

According to the present invention, a pneumatic tire comprises a tread portion provided with a tread pattern bound with an intended tire rotational direction, wherein the tread portion is provided with a plurality of main grooves extending continuously in the tire circumferential direction, the main grooves include a pair of shoulder main grooves disposed one on each side of the tire equator, a pair of middle main grooves disposed between the shoulder main grooves, and a crown main groove disposed between the middle main grooves, whereby the tread portion is provided with a middle land region defined between each of the middle main grooves and the adjacent shoulder main groove, each of the middle main grooves comprises first oblique segments and second oblique segments alternately arranged to have a zigzag configuration, and inclined with respect to the tire circumferential direction, the first oblique segments are inclined axially outwardly toward the opposite direction to the intended tire rotational direction, and have a circumferential length, the second oblique segments are inclined oppositely to the first oblique segments, and have a circumferential length less than the circumferential length of the first oblique segments, the middle land region is provided with a plurality of middle transverse grooves extending between the adjacent middle main groove and shoulder main groove, the middle transverse grooves each have a depth less than the middle main groove, the middle transverse grooves are parallel with the tire axial direction, or alternatively, inclined with respect to the tire circumferential direction to the same axial direction as the first oblique segments of the middle main groove, and the middle transverse grooves each have an axially inner end connected to one of the second oblique segments so that the axially inner end includes at least a part of one of axially outwardly protruding outside corner portions of the middle main groove.

Further, the pneumatic tire according to the present invention may include the following features:
(1) the axially inner end of each of the middle transverse grooves is connected to one of the second oblique segments so as to include at least a part of an axially inwardly protruding inside corner portion of the middle main groove;
(2) the crown main groove and the shoulder main grooves extend straight along the tire circumferential direction;
(3) in each of the middle main grooves, the angle formed between the first oblique segment and the second oblique segment is not less than 90 degrees;
(4) the depth of each of the middle transverse grooves is in a range of from 50% to 83% of the depth of the middle main groove;
(5) the middle land regions are divided into a plurality of middle blocks by the middle transverse grooves, and the middle blocks may include at least one middle block provided with a chamfer at a corner between the first oblique segment and the middle transverse groove;
(6) the first oblique segment includes an arc-shaped part curved so that its axially outward inclination toward the opposite direction to the rotational direction is increased.

In the pneumatic tire according to the present invention, the main grooves extending continuously in the tire circumferential direction include the crown main groove, a pair of the middle main grooves extending on both sides of the crown main groove, and a pair of the shoulder main grooves extending on both outer sides of the middle main grooves. As these main grooves each extend continuously in the tire circumferential direction, in each of the crown, middle, and shoulder regions of the tread portion, the drainage function as their main function is exerted in a good balance during traveling on the wet road surface.

Also, each of the middle main grooves has a zigzag configuration in which the first oblique segments and second oblique segments are alternately arranged, wherein the first oblique segments are inclined outwardly in the axial direction toward the toe-side in the rotational direction or toward the opposite direction to the rotational direction, and the second oblique segments are inclined oppositely to the first oblique segments and have the circumferential length less than the first oblique segments.

Therefore, as the tire rotates, the first oblique segments can guide water on the road surface toward the outside in the tire axial direction during traveling on the wet road surface. Further, as the first oblique segments, which mainly exert the drainage function, have the circumferential length greater than the second oblique segments, the drainage effect of the middle main groove can be further improved.

The middle land regions defined between the middle main grooves and the shoulder main grooves are provided with a plurality of the middle transverse grooves which have the depth less than the middle main grooves. Each of the middle transverse grooves is inclined outwardly in the tire axial direction toward the toe-side in the rotational direction, or alternately, extends in parallel with the tire axial direction. Further, the axially inner end of each of the middle transverse grooves is connected to one of the second oblique segments so as to include at least a part of an axially outwardly protruding outside corner portion of the middle main groove.

According to the above configuration, it is possible that a part of the groove wall on the toe-side in the rotational direction, of the middle transverse groove is positioned in an extended area of the first oblique segment extended toward the toe-side in the rotational direction. Therefore, during traveling on the wet road surface, water passing through the first oblique segment flows smoothly into the middle transverse grooves without substantially resisted by the second oblique segments and can be discharged toward the axially outside.

On the other hand, if the water film on the wet road surface is thick, the amount of water passing through the middle main grooves is increased. In this case, in addition to the above-described discharging function, the water can be discharged toward the tire circumferential direction by using the second oblique segments.

Thus, in the pneumatic tire according to the present invention, the water under the tread portion is effectively discharged toward the axially outer sides of the tire and to the tire circumferential direction, and the generation speed of aquaplaning phenomenon can be increased, i.e. the anti-aquaplaning performance can be improved. Also, the middle land region is provided with relatively high pattern rigidity, therefore, the steering stability as of a rain tire can be improved. Thereby, the pneumatic tire of the present invention can improve the steering stability to a higher level while maintaining the wet performance.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load capacity" in ETRTO, the maximum value given in the above-mentioned table in TRA or the like.

In case of passenger car tires, however, the standard pressure and standard tire load are uniformly defined by 180 kPa and 88% of the maximum tire load, respectively.

The tread edges Te are the axial outermost edges of the ground contacting patch which occurs under the normally inflated loaded condition when the camber angle of the tire is zero.

The tread width TW is the width measured under the normally inflated unloaded condition, as the axial distance between the tread edges Te determined as above.

DESCRIPTION OF THE PREFERRED EMBODIMENTS

Embodiments of the present invention will now be described in detail in conjunction with accompanying drawings.

Figure 1:
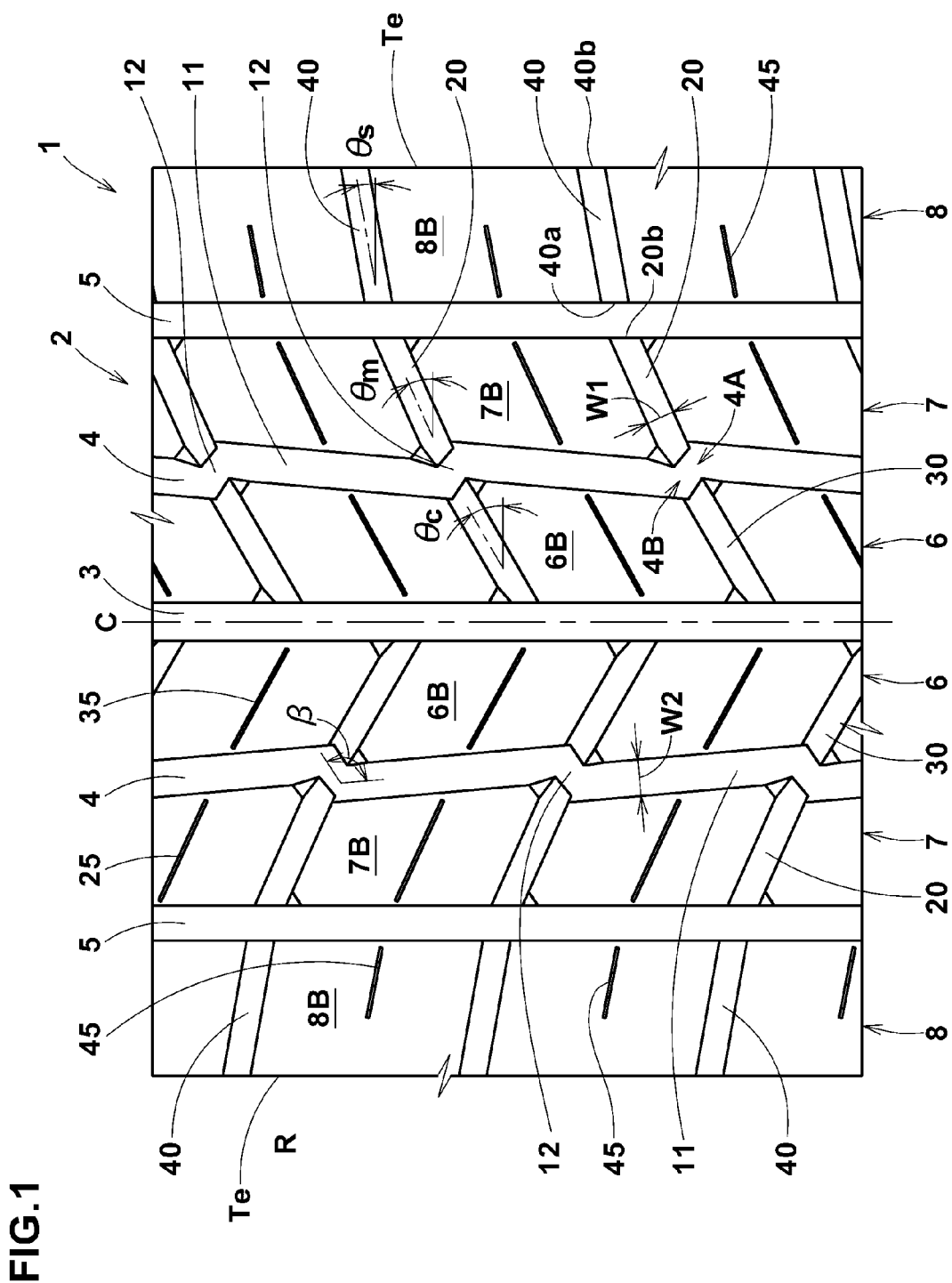
FIG. 1 is a developed partial view of a tread portion of a pneumatic tire as an embodiment of the present invention.

FIG. 1 shows the tread portion 2 of a pneumatic tire 1 as an embodiment of the present invention.

The pneumatic tire 1 in this embodiment is a high-speed racing tire suitable for running on wet roads in motor sports.

The pneumatic tire 1 has an intended tire rotational direction R specified, and the tread portion 2 is provided with a unidirectional tread pattern bound with the rotational direction R as shown in FIG. 1 for example.

The tread pattern is designed so as to exert excellent wet performance and steering stability when used in the specified rotational direction R.

The rotational direction R is indicated, for example, in a sidewall portion of the pneumatic tire 1 by characters, symbols and the like.

The tread portion 2 is provided with a plurality of main grooves (3, 4, and 5).

In this specification, the main grooves (3, 4, and 5) mean ones extending continuously in the tire circumferential direction and having groove volume capable of contributing to drainage performance in substance. The main grooves typically have a width of not less than 5.0 mm and a depth of not less than 3.0 mm, for example. On the other hand, if the groove volume is too large, there is a possibility that the steering stability and the wear resistance are deteriorated, as described above. From these points of view, it is preferable that the main groove (3, 4, and 5) has the width of not greater than 15.0 mm and the depth of not greater than 8.0 mm.

The main grooves include a crown main groove 3, a pair of middle main grooves 4 extending on both sides of the crown main groove 3, and a pair of shoulder main grooves 5 extending on both outer sides of the middle main grooves 4.

By the main grooves 3, 4 and 5, the tread portion 2 is divided into six land regions: a pair of crown land regions 6 between the crown main groove 3 and the middle main grooves 4; a pair of middle land regions 7 between the middle main grooves 4 and the shoulder main grooves 5; and a pair of shoulder land regions 8 axially outside of the shoulder main grooves 5.

Preferably, the main grooves 3, 4 and 5 are arranged so that the widths (maximum widths) of the land regions 6, 7, and 8 are substantially same.

In this embodiment, the main grooves are the five grooves 3, 4 and 5 only. The crown main groove 3 is positioned on the tire equator c in this example, and exerts the main drainage function in the crown area (the central area) of the tread portion 2. The crown main groove 3 can exert its drainage function effectively by using the high ground pressure around the tire equator C even though it is not provided plurally. It is preferable that the crown main groove extends straight along the tire circumferential direction. The crown main groove configured as such can, compared to a zigzag groove, improve both the drainage performance and the steering stability during high-speed straight running.

As a modified example of the crown main groove, two crown main grooves may be provided. In this case, the crown main groove 3 is preferably provided on each side of the tire equator C. However, in order to improve the steering stability more effectively, it is most preferable that the crown main groove 3 is single as in the present embodiment.

Of the main grooves, the shoulder main groove 5 on each side of the tire equator C is disposed on the most tread-edge-Te side. The shoulder main grooves 5 exert the main drainage function in the shoulder area (edge area) of the tread portion 2. Preferably, the shoulder main grooves 5 extend straight along the tire circumferential direction.

The shoulder main grooves 5 configured as such can, compared to a zigzag groove, improve the drainage performance and suppress degradation of the shoulder land regions 8 in the lateral rigidity, therefore the steering stability during cornering can be improved.

The middle main grooves 4 are disposed one on each side of the tire equator between the crown main groove 3 and the shoulder main groove 5.

The middle main grooves 4 exert the main drainage function in the middle areas (intermediate areas) of the tread portion 2. Preferably, the middle main groove 4 is disposed at a substantially intermediate position between the crown main groove 3 and the shoulder main groove 5.

Each of the middle main grooves 4 has a zigzag configuration. The middle main groove 4 in this embodiment includes first oblique segments 11 which are inclined outwardly toward the toe-side in the rotational direction R (namely, the opposite direction to the rotational direction R), and second oblique segments 12 which are inclined oppositely to the first oblique segments 11 and have a circumferential length less than the first oblique segments 11. The first oblique segments 11 and the second oblique segments 12 are alternately arranged in the tire circumferential direction. Thereby, the middle main groove 4 is provided at the connecting positions between the first oblique segments 11 and the second oblique segments 11 with axially outwardly protruding outside corner portions 4A and axially inwardly protruding inside corner portions 4B.

More specifically, each outside corner portion 4A is formed between one of the second oblique segments 11 and one of the first oblique segments 11 on the heel-side thereof, and each inside corner portion 4B is formed between one of the second oblique segments 11 and one of the first oblique segments 11 on the toe-side thereof.

The first oblique segments 11 exert an effect to guide the water on the road surface toward the axially outside as the tire rotates when running on wet roads. Further, since the first oblique segments 11 have the circumferential length greater than the second oblique segments 12, such drainage effect can be exerted more effectively.

In this embodiment, each of the first oblique segment 11 and the second oblique segment 12 is configured as being straight as a preferable configuration, but their configurations are not limited thereto.

By the way, zigzag main grooves are usually pointed out as having a downside in respect to the stability during high-speed straight running and the steering stability during cornering. However, such downside can be suppressed to the minimum in the case where the crown main groove having the biggest influence thereon is configured as a straight groove, and the use of a zigzag groove is limited to the middle main grooves and the main grooves located on the axially outer side of the middle main grooves. For these reasons, the middle main grooves in the present embodiment are configured as zigzag grooves.

The middle land regions 7 are provided with a plurality of the middle transverse grooves 20 each connecting the middle main groove 4 with the shoulder main groove 5.

Figure 2:
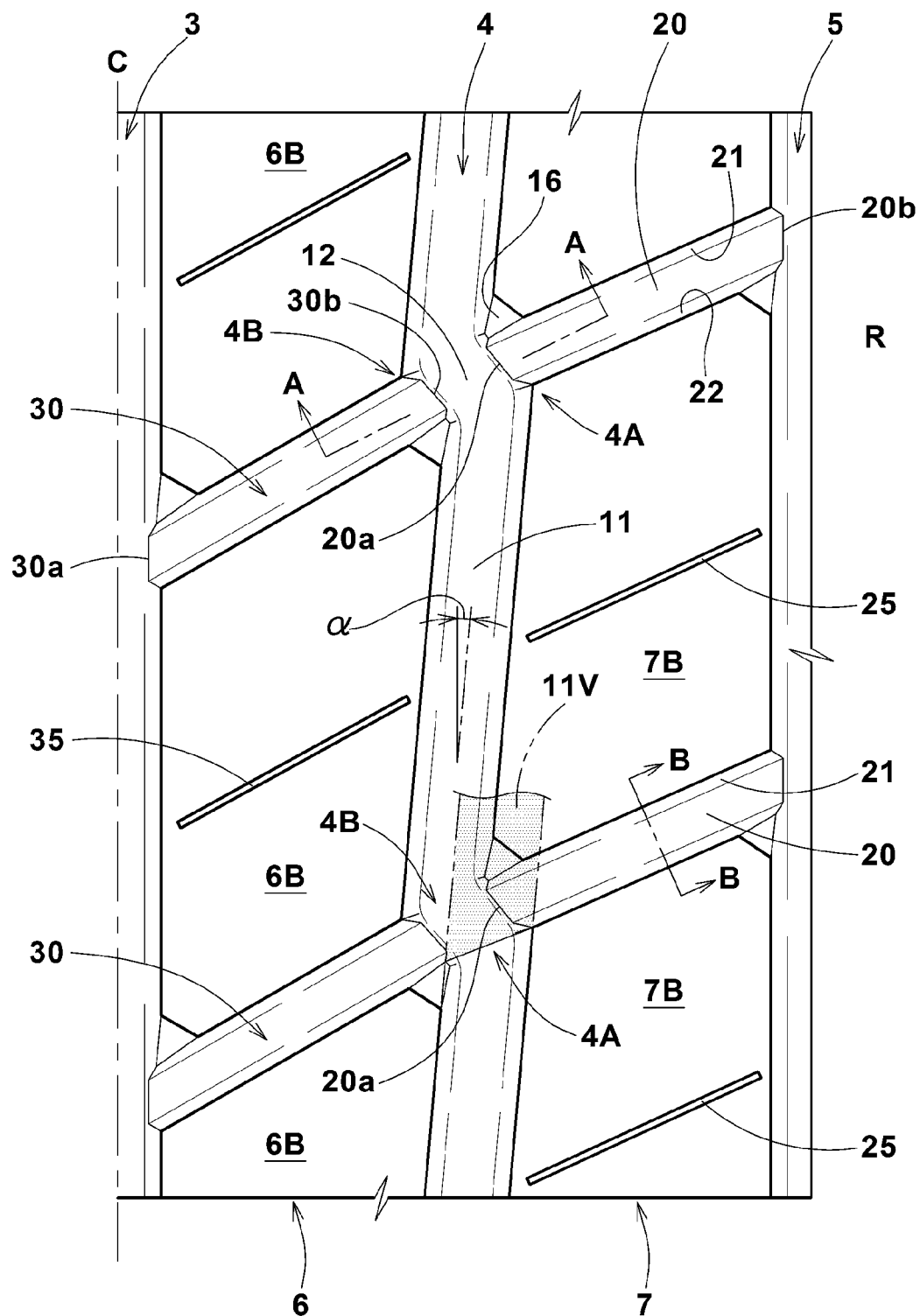
FIG. 2 is a magnified view showing the junctions of the middle transverse grooves with the zigzag middle main groove.

FIG. 2 is a magnified view of the main part around the middle main groove 4 shown in FIG. 1.

As shown in FIG. 2, each of the middle transverse grooves 20 in this example extends straight, and its axially inner end 20a and axially outer end 20b are connected to the middle main groove 4 and the shoulder main groove 5, respectively. Thereby, the middle land regions 7 are each divided into a plurality of quadrate middle blocks 7B in a circumferential row.

In the present embodiment, on each side of the tire equator, the middle transverse grooves 20 are inclined to the same direction as the first oblique segments 11, i.e. inclined outwardly in the axial direction toward the toe-side in the rotational direction R (namely, the opposite direction to the rotational direction R).

Owing to such inclination, the middle transverse grooves 20 can guide the water film under the tread portion 2 toward the axially outside as the tire rotates in the same way as the first oblique segments 11.

As another example of the arrangement of the middle transverse grooves 20, it may be possible that the middle transverse grooves 20 each extend along the tire axial direction, i.e. incline at 90 degrees with respect to the tire circumferential direction.

Figure 3:
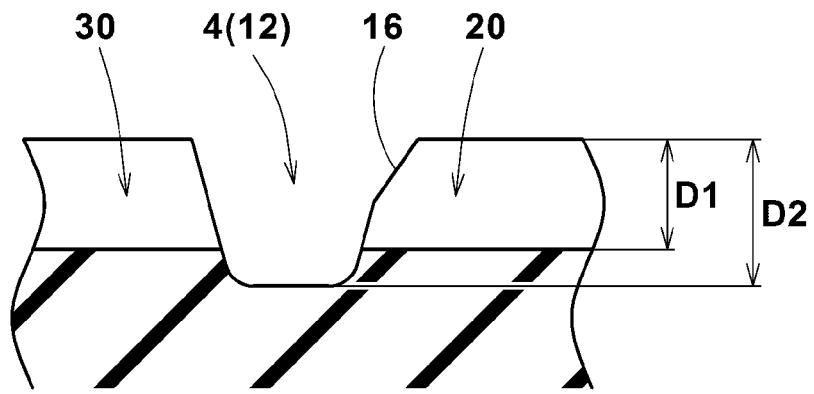
FIG. 3 is a cross-sectional view taken along line A-A in FIG. 2 showing the depths of the middle transverse groove and the zigzag middle main groove.

In FIG. 3, a cross-sectional view taken along line A-A in FIG. 2 is shown. As shown in FIG. 3, the middle transverse groove 20 is configured so as to have the depth D1 less than the depth D2 of the middle main groove 4. Thereby, the middle land regions 7 (the middle blocks 7B) are improved in the pattern rigidity, especially in the circumferential rigidity and the torsional rigidity. Therefore, the stability during straight running is improved and the steering stability is improved. It is not essential but desirable that the depth D1 of the middle transverse groove 20 is not less than 50%, preferably from 50% to 83% of the depth D2 of the middle main groove 4 in order to exert the high steering stability while maintaining the drainage function of the middle transverse grooves 20.

Figure 4:
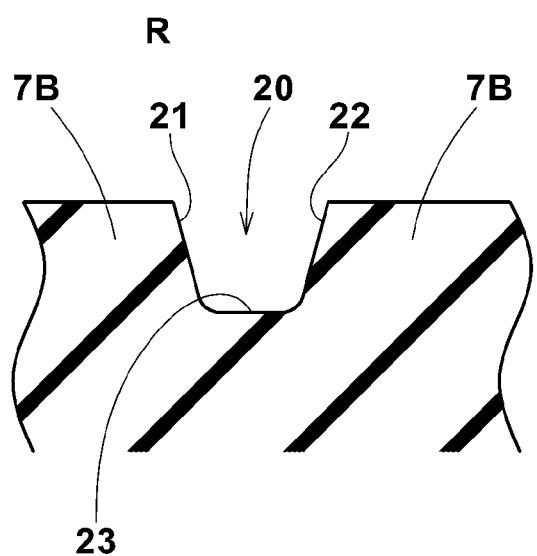
FIG. 4 is a cross-sectional view of the middle transverse groove taken along line B-B in FIG. 2.

FIG. 4 is a cross sectional view taken along line B-B in FIG. 2. As shown in FIG. 4, the middle transverse groove 20 has a groove bottom 23, a groove wall 21 located on the toe-side in the rotational direction R, and a groove wall 22 located on the heel-side in the rotational direction R.
The groove walls 21 and 22 are each inclined so that the groove width increases toward the groove top as in the conventional configurations.
The groove width of the middle transverse groove 20 may be set arbitrarily, but preferably set in a range of from 65% to 100% of the groove width of the middle main groove 4 in order to balance the drainage performance and the steering stability.

To get back to FIG. 2, an axially inner end 20a of each of the middle transverse grooves 20 is connected to one of the second oblique segments 12 so that the axially inner end 20a includes at least a part of the outside corner portion 4A between the second oblique segment 12 and the first oblique segment 11 on the heel-side thereof, which part is positioned on the second oblique segment side. In other words, the axially inner end 20a opens at such part of the outside corner portion 4A. Accordingly, an axially inner part of the toe-side wall 21 faces or overlaps with an extended part 11v (illustrated with shades in FIG. 2) of the first oblique segment 11.

Figure 5A:
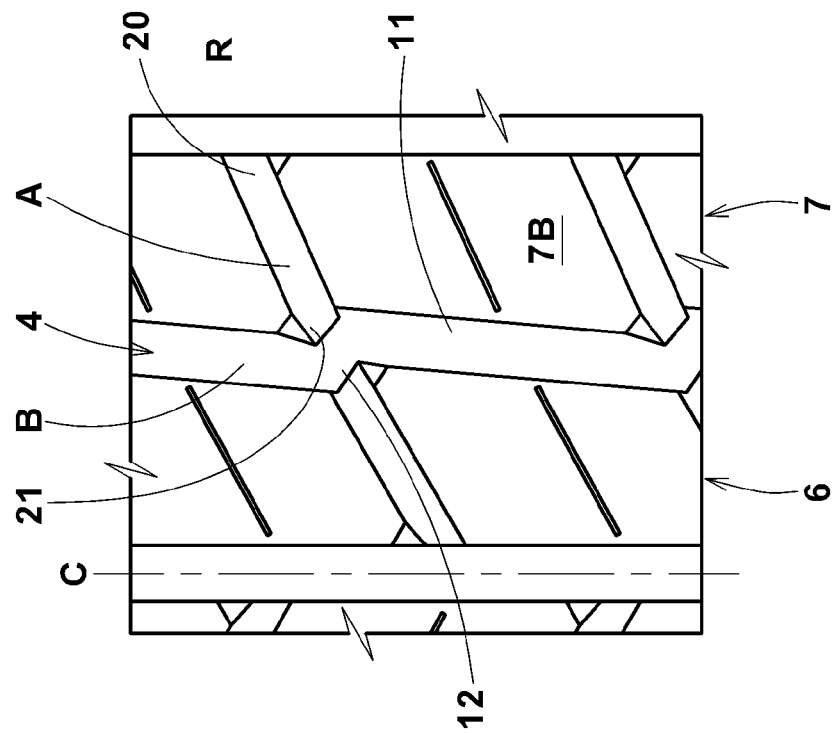
FIG. 5A is a diagram for explaining a water flow from the first oblique segment to the middle transverse groove.
Figure 5B:
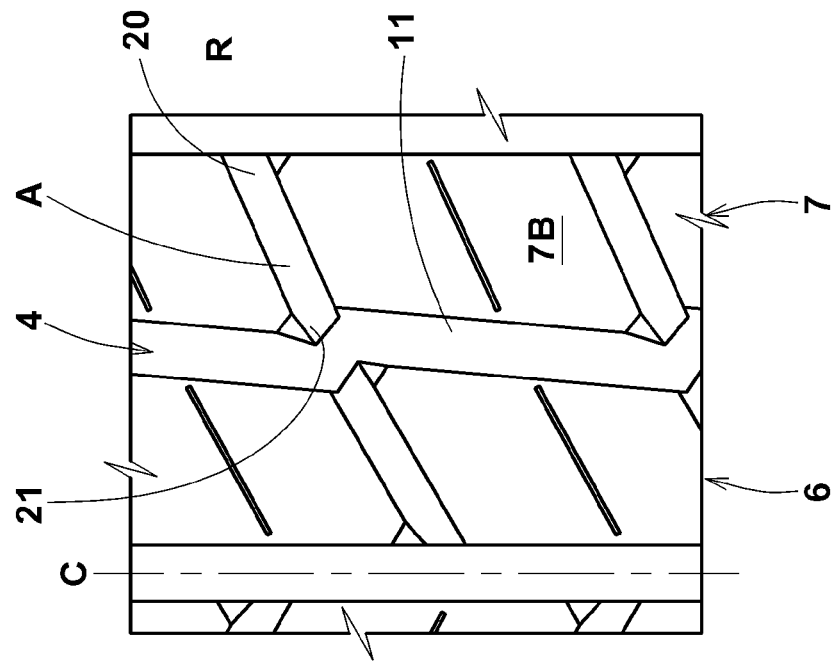
FIG. 5B is a diagram for explaining a split flow occurring when the water on the road surface is comparatively thick.

FIGS. 5A and 5B are diagrams for illustrating water flows when running on a wet road surface.

If the water film thickness on the wet road surface is comparatively small (for example, less than 5 mm), the water passing through the first oblique segment 11 and colliding with the toe-side groove wall 21 of the middle transverse groove 20 is, as shown in FIG. 5A, changed its flow direction there (flow A), and discharged smoothly toward the axially outside through the middle transverse groove 20 inclining to the same direction as the first oblique segment 11. Thereby, the water on the road surface under the tread portion 2 is discharged from the sides of the tire 1.

On the other hand, if the water thickness on the wet road surface is comparatively large (for example, more than 5 mm), the water passing through the first oblique segment 11 is, as shown in FIG. 5B, split from the above-mentioned flow (A), and also discharged toward the circumferential direction by using the second oblique segment 12 (flow B).

As described above, in pneumatic tire 1 in this embodiment, since the connecting position of the shallower middle transverse groove 20 with the deeper middle main groove 4 is optimized, the middle land regions 7 are provided with a high pattern rigidity to improve the steering stability as the rain tire, and the water passing through the middle main groove 4 can be discharged effectively toward the sides of the tire. Further, if the water thickness on the wet road surface is large, owing to the split flow B and the main flow (A), the occurrence of the aquaplaning phenomenon can be effectively prevented.

Further, it is preferred that the axially inner end 20a of each of the middle transverse grooves 20 is connected to one of the second oblique segments 12 so that the axially inner end 20a includes at least a part of the inside corner portion 4B, which part is positioned on the second oblique segment side. In other words, the axially inner end 20a ranges over the almost entire length of the second oblique segment 12. Thereby, it is possible to face a wider inner part of the toe-side groove wall 21 of the middle transverse groove 20 to the extended part 11v (illustrated with shades in FIG. 2) of the first oblique segment 11. Therefore, the percentage of the water flow (A) toward the sides of the tire shown in FIG. 5A can be relatively increased.

In order to guide the water on the road surface under the tread portion 2 toward the sides of the tire and increase the water flow (A), the angle α of the first oblique segment 11 with respect to the tire circumferential direction is preferably not less than 3 degrees, more preferably not less than 5 degrees, and preferably not greater than 20 degrees, more preferably not greater than 10 degrees.

Further, the angle θm of the middle transverse groove 20 with respect to the tire axial direction is preferably not less than 10 degrees, more preferably from 10 to 30 degrees in order to more surely achieve the above-mentioned water flow (A).

Furthermore, in the middle main groove 4, the angle β formed between the first oblique segment 11 and the second oblique segment is preferably not less than 90 degrees, more preferably not less than 100 degrees in order to more surely achieve the above-mentioned water flow (B).
On the other hand, if the angle β is too large, there is a possibility that the circumferential length of the second oblique segment 12 becomes too large, and that the drainage performance is deteriorated. From this point of view, the angle β is preferably not greater than 100 degrees, for example.

Figure 6:
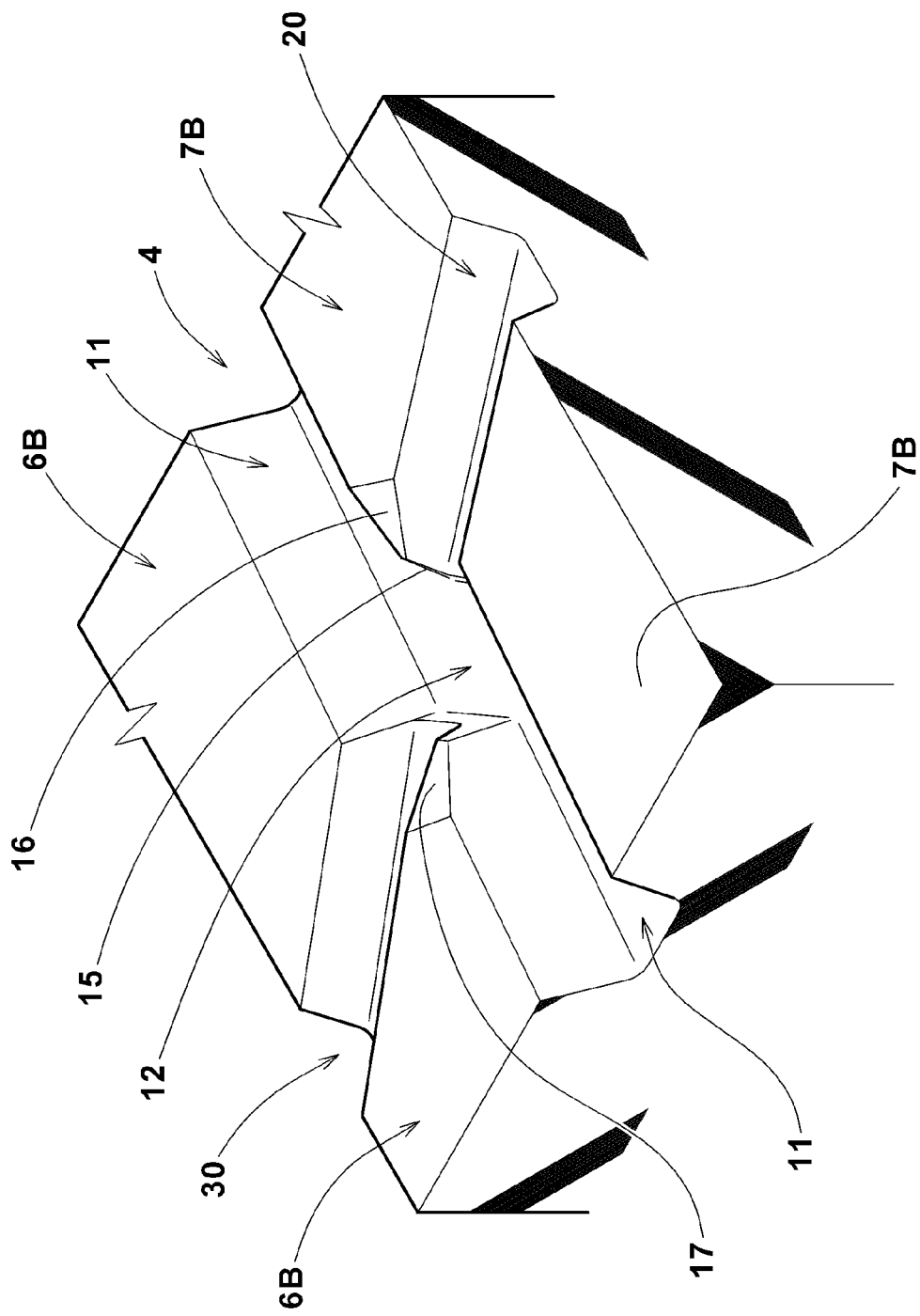
FIG. 6 is a perspective view showing the junction of the middle transverse groove with the zigzag middle main groove.

FIG. 6 shows the connecting position or junction of the middle transverse groove with the zigzag middle main groove.

It is preferable that the middle blocks 7B include at least one middle block provided with a chamfer 16 at a corner 15 between the first oblique segment 11 and the middle transverse groove 20 as shown in FIG. 6. The chamfer 16 in this example is a substantially triangle slope face intersecting three faces i.e. the ground contacting surface of the middle block 7B, the groove wall of the first oblique segment 11, and the groove wall of the middle transverse groove 20.
By providing the chamfer 16 configured as such, it is possible, in the ground contacting patch, to smoothly split the water flow (split flow B) from the water flow (main flow A).
Therefore, even in a situation where the water thickness on the road surface changes quickly, for example, the tire 1 in this embodiment can drain the water quickly by using both the water flows (A) and (B), and the occurrence of an instantaneous aquaplaning phenomenon can be prevented.

To get back to FIG. 2, it is not essential but preferable that the crown land regions 6 are each provided with a plurality of the crown transverse grooves 30.
The crown transverse groove 30 in this example extends straight, and its axially inner end 30a and axially outer end 30b are connected to the crown main groove 3 and the middle main groove 4, respectively. Thereby, the crown land regions 6 are each divided into a plurality of substantially quadrate crown middle blocks 6B in a circumferential row.
Preferably, the width and the depth of the crown transverse groove 30 are respectively set in the same ranges as the middle transverse groove 20.

Further, the axially outer ends 30b of the crown transverse grooves 30 are respectively connected to the second oblique segments 12 of the middle main groove 4. In this embodiment, the outer end 30b of the crown transverse groove 30 is connected with the entire range in the length direction of the second oblique segment 12 of the middle main groove 4 as shown in FIG. 2.

Further, on each side of the tire equator C, the crown transverse grooves 30 are inclined to the same direction as the middle transverse grooves 20, i.e. inclined axially outwardly toward the toe-side in the rotational direction R. Owing to such inclination, the crown transverse grooves 30 can guide the water film under the tread portion 2 toward the axially outside as the tire rotates in the same way as the first oblique segments 11.

In order to effectively exert the above-described drainage function, the angle θc of the crown transverse groove 30 with respect to the tire axial direction is preferably not less than 10 degrees, more preferably not less than 20 degrees.

In particular, it is desirable that the angle θc of the crown transverse groove 30 with respect to the tire axial direction is the same as, or alternately different by at most 10 degrees from the angle θm of the middle transverse groove 20 with respect to the tire axial direction. In the latter case, it is preferable that θc>θm. In a case where the angle θc is set as such, since the crown transverse groove 30 and the middle transverse groove 20 are aligned in substance, it is possible that the water overflowed from the crown main groove 3 is guided smoothly toward the outside of the tire via the crown transverse groove 30 and the middle transverse groove 20.

It is preferable that the crown blocks 6B include at least one crown block provided with a chamfer 17 at a corner between the first oblique segment 11 and the crown transverse groove 30 as shown in FIG. 6. The chamfer 17 in this example is a substantially triangle slope face intersecting three faces, i.e. the ground contacting surface of the crown block 6B, the groove wall of the first oblique segment 11, and the groove wall of the crown transverse groove 30. By providing the chamfer 17 configured as such, it is possible to smoothly guide the water from the crown transverse groove 30 to the middle main groove 4.

It is not essential but preferable that the shoulder land regions 8 are each provided with a plurality of shoulder transverse grooves 40 as shown in FIG. 1.

The shoulder transverse groove 40 in this example extends straight, and its axially inner end 40a and axially outer end 40b are connected with the shoulder main groove 5 and the tread edge Te, respectively. Thereby, the shoulder land regions 8 are each divided into a plurality of substantially quadrate shoulder blocks 8B in a circumferential row. It is preferable that the width and the depth of the shoulder transverse groove 40 are set in the same ranges as the middle transverse groove 20.

Preferably, the inner end 40a of the shoulder transverse groove 40 is located at such a position that it faces the outer end 20b of the middle transverse groove 20. Thereby, when running on a wet road surface, the water passed through the middle transverse groove 20 is discharged toward the sides of the tire from the shoulder transverse groove 40 via the shoulder main groove 5.

It is preferable that each of the shoulder transverse grooves is extended along the tire axial direction or alternately inclined in the same direction as the middle transverse groove 20, i.e. inclined axially outwardly toward the toe-side in the rotational direction R on each side of the tire equator C. Owing to such inclination, it is possible to guide the water film under the tread portion 2 toward the axially outside as the tire rotates.

Further, in order to increase the lateral rigidity of the shoulder blocks 8B and improve the cornering performance while exerting the above-described drainage function smoothly, it is preferred that the angle θs of the shoulder transverse groove 40 with respect to the tire axial direction is not less than 5 degrees and smaller than the angle θm of the middle transverse groove 20 (θs<θm).

The crown block 6B, the middle block 7B, and the shoulder block 8B are provided with crown sipes 35, middle sipes 25, and shoulder sipes 45, respectively.

Each of the sipes 35, 25, and 45 is a thin groove having a width not greater than 1 mm and a depth smaller than the adjacent transverse grooves. In this embodiment, each of the sipes 35, 25, and 45 is configured as a closed sipe whose both ends terminate within the block provided with the concerned sipe, and the sipe is disposed at the center of the block in the tire circumferential direction.

Further, each of the sipes 35, 25, and 45 extends substantially straight in parallel with the crown transverse groove 30, the middle transverse groove 20, and the shoulder transverse groove 40, respectively. These sipes 35, 25, and 45 improve the ground contact of the crown block 6B, the middle block 7B, and the shoulder block 8B, while suppressing the decrease in the block rigidity, which helps to improve the steering stability.

Figure 7:
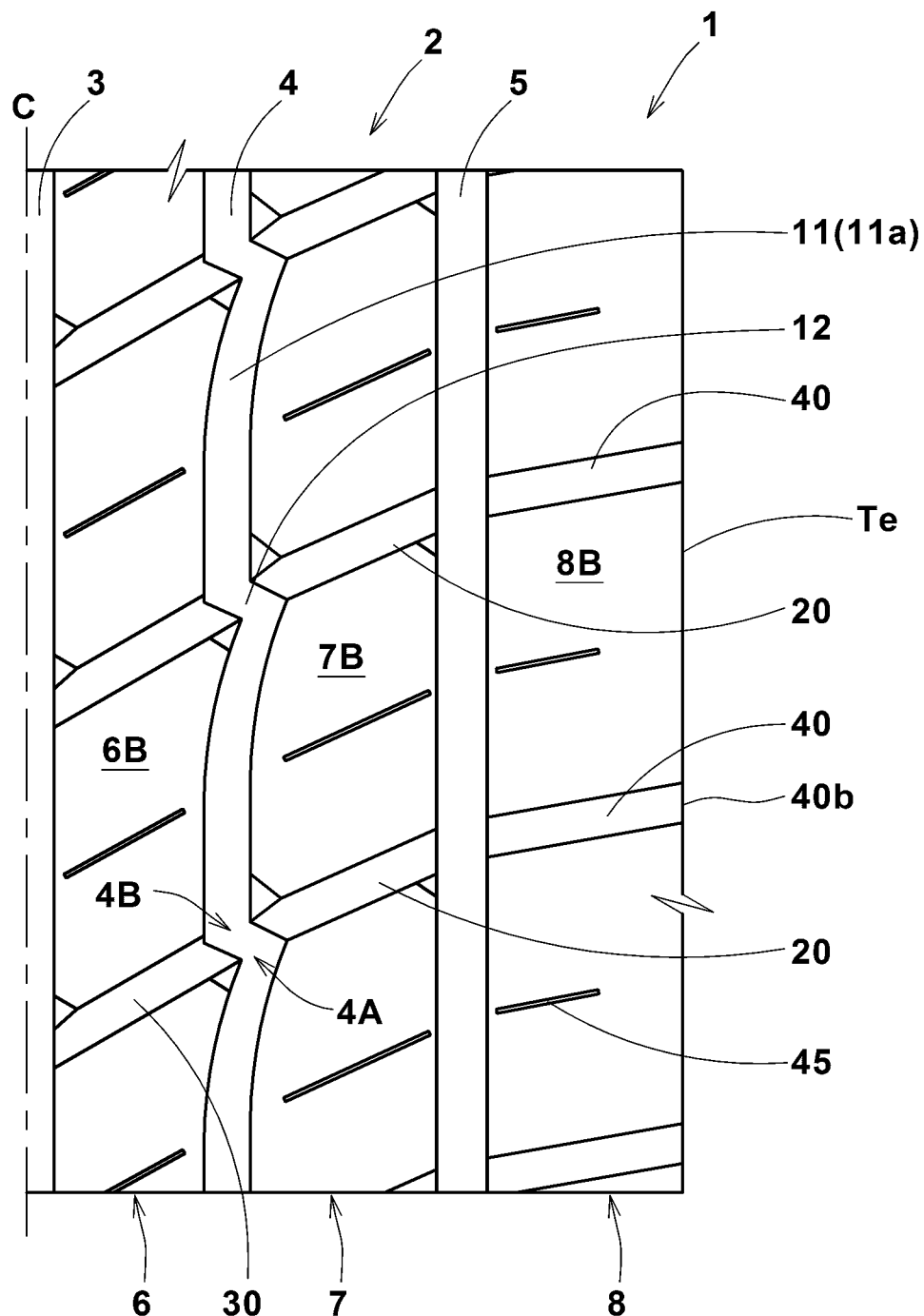
FIG. 7 is a developed partial view of a tread portion showing another example of the zigzag configuration of the middle main groove.

FIG. 7 shows another example of the configuration of the middle main groove 4, wherein the first oblique segment 11 of the middle main groove 4 includes an arc-shaped part 11a. The arc-shaped part 11a is configured as an arc whose center is positioned on the shoulder-main-groove side. Thereby, the arc-shaped part 11a is curved so that its axially outward inclination increases toward the toe-side in the rotational direction R, namely, toward the opposite direction to the rotational direction R. In this example, the entirety of the first oblique segment 11 is formed by such arc-shaped part 11a. The first oblique segment 11 configured as such can exert the above-described excellent drainage function as well.

While detailed description has been made of the embodiments of the present invention, the present invention can be embodied in various forms without being limited to the illustrated specific embodiments.

WORKING EXAMPLES

In order to confirm the effects of the present invention, racing rain tires of size 245/40R18 were made by way of test based on the tread pattern shown in FIG. 1, and the tires were evaluated in respect to the hydro-performance and the steering stability using an actual vehicle.

The test vehicle was a 4WD-car with displacement of 2000 cc. The test tires were mounted on all of the four wheels of the test car. Each of the test tires was mounted on a 18×8.5J rim and inflated to 200 kPa.

The actual vehicle evaluation was performed by driving the test car on an asphalt road surface of a test course with the driver being the only member in the test car. The steering stability was evaluated based on the driver's feeling. The results are indicated in Table 1 by a point in the evaluation based on the comparative example 1 being 100, wherein the higher the point, the better the steering stability.

The hydro-performance was evaluated based on the cornering G measured during cornering on the course with a puddle of about 1 mm (light rain) and a puddle of about 5 mm (heavy rain) in the water film thickness. The results are indicated in Table 1 by an index based on the comparative example 1 being 100, wherein the larger the index value, the better the hydro-performance.

In Table 1, the angle θm of the middle transverse groove is indicated as positive when it is inclined axially outwardly toward the toe-side in the tire rotational direction and as negative when it is inclined axially inwardly toward the toe-side in the tire rotational direction.

TABLE 1

|  | Comp. example 1 | Comp. example 2 | Working example 1 | Comp. example 3 | Working example 2 | Working example 3 | Working example 4 | Working example 5 | Working example 6 |
|---|---|---|---|---|---|---|---|---|---|
| Depth D2 of middle main groove (mm) | 6 | 6 | 6 | 6 | 6 | 6 | 6 | 6 | 6 |
| Width W2 of middle main groove (mm) | 10 | 10 | 10 | 10 | 10 | 10 | 10 | 10 | 10 |
| Zigzag configuration of middle main groove | No | No | Yes | Yes | Yes | Yes | Yes | Yes | Yes |
| Angle α of first oblique segment (deg.) | 0 | 0 | 5 | 5 | 5 | 5 | 5 | 5 | 5 |
| Angle β between first oblique segment and second oblique segment (deg.) | — | — | 110 | 110 | 110 | 110 | 110 | 80 | 90 |
| Depth D1 of middle transverse groove (mm) | 6 | 4.5 | 4.5 | 4.5 | 4.5 | 4.5 | 4.5 | 4.5 | 4.5 |
| Ratio D1/D2 (%) | 100 | 75 | 75 | 75 | 75 | 75 | 75 | 75 | 75 |
| Width W1 of middle transverse groove (mm) | 10 | 10 | 10 | 10 | 10 | 10 | 10 | 10 | 10 |
| Angle θm of middle transverse groove (deg.) | — | — | 20 | −10 | 0 | 10 | 30 | 20 | 20 |
| Chamfer of middle block | No | No | No | No | No | No | No | No | No |
| Hydro-performance [light rain] | 100 | 105 | 110 | 100 | 110 | 110 | 110 | 110 | 110 |
| Hydro-performance [heavy rain] | 100 | 80 | 100 | 80 | 95 | 100 | 100 | 80 | 90 |
| Steering Stability | 100 | 110 | 120 | 110 | 120 | 120 | 120 | 120 | 120 |

|  | Working example 7 | Working example 8 | Working example 9 | Working example 10 | Working example 11 | Comp. example 4 | Working example 12 | Working example 13 |
|---|---|---|---|---|---|---|---|---|
| Depth D2 of middle main groove (mm) | 6 | 6 | 6 | 6 | 6 | 6 | 6 | 6 |
| Width W2 of middle main groove (mm) | 10 | 10 | 10 | 10 | 10 | 10 | 10 | 10 |
| Zigzag configuration of middle main groove | Yes | Yes | Yes | Yes | Yes | Yes | Yes | Yes |
| Angle α of first oblique segment (deg.) | 5 | 5 | 5 | 5 | 5 | 5 | 5 | 10 |
| Angle β between first oblique segment and second oblique segment (deg.) | 100 | 110 | 110 | 110 | 110 | 110 | 110 | 110 |
| Depth D1 of middle transverse groove (mm) | 4.5 | 2 | 3 | 4 | 5 | 6 | 4.5 | 4.5 |
| Ratio D1/D2 (%) | 75 | 33 | 50 | 67 | 83 | 100 | 75 | 75 |
| Width W1 of middle transverse groove (mm) | 10 | 10 | 10 | 10 | 10 | 10 | 10 | 10 |
| Angle θm of middle transverse groove (deg.) | 20 | 20 | 20 | 20 | 20 | 20 | 20 | 20 |
| Chamfer of middle block | No | No | No | No | No | No | Yes | No |
| Hydro-performance [light rain] | 110 | 115 | 115 | 110 | 105 | 100 | 110 | 110 |
| Hydro-performance [heavy rain] | 100 | 85 | 90 | 95 | 110 | 100 | 105 | 105 |
| Steering stability | 120 | 140 | 135 | 125 | 110 | 100 | 120 | 120 |

From the test results, it was confirmed that the tires as the working examples improved the steering stability to higher levels while maintaining the wet performance.

REFERENCE SIGNS LIST

1 pneumatic tire
2 tread portion
3 crown main groove
4 middle main groove
4A outside corner portion
4B inside corner portion
5 shoulder main groove
6 crown land region
7 middle land region
8 shoulder land region
11 first oblique segment
12 second oblique segment
20 middle transverse groove

The invention claimed is:

1. A pneumatic tire comprising
a tread portion bound with an intended tire rotational direction, and provided with a plurality of main grooves extending continuously in a tire circumferential direction,
wherein the intended tire rotation direction is indicated in a sidewall portion of the tire,
wherein the main grooves include a crown main groove, a pair of middle main grooves extending on both sides of the crown main groove, and a pair of shoulder main grooves extending on both outer sides of the middle main grooves, wherein
each of the middle main grooves has, in its top view, a zigzag configuration in which first oblique segments and second oblique segments are alternately arranged, wherein
the first oblique segments inclined outwardly in the tire axial direction toward the opposite direction to the intended tire rotational direction, and
the second oblique segments inclined oppositely to the first oblique segments, and having a circumferential length less than the first oblique segments,
wherein middle land regions defined between the middle main grooves and the shoulder main grooves are provided with a plurality of middle transverse grooves connecting between the middle main grooves and the shoulder main grooves, wherein
the middle transverse grooves inclined to the same direction as the first oblique segments, or alternatively, extending in parallel with the tire axial direction,
each of the middle transverse grooves has a depth less than the middle main grooves, and
the axially inner end of each of the middle transverse grooves is connected to one of the second oblique segments so as to include at least an axially outwardly protruding outside corner portion of the middle main groove, and
wherein grooves disposed in the tread portion and extending continuously in the tire circumferential direction are said crown main groove which is a straight groove, said pair of middle main grooves which are said zigzag grooves, and said pair of shoulder main grooves which are straight grooves.

2. The pneumatic tire according to claim 1, wherein
the axially inner end of each of the middle transverse grooves is connected to one of the second oblique segments so as to include an axially inwardly protruding inside corner portion of the middle main groove.

3. The pneumatic tire according to claim 2, wherein, in each of the middle main grooves, the angle formed between the first oblique segment and the second oblique segment is not less than 90 degrees.

4. The pneumatic tire according to claim 2, wherein the depth of each of the middle transverse grooves is in a range of from 50% to 83% of the depth of the middle main groove.

5. The pneumatic tire according to claim 2, wherein the middle land regions are divided into a plurality of middle blocks by the middle transverse grooves, and
the middle blocks include at least one middle block provided with a chamfer at a corner between the first oblique segment and the middle transverse groove.

6. The pneumatic tire according to claim 2, wherein the first oblique segment includes an arc-shaped part curved so that its axially outward inclination toward the opposite direction to the rotational direction is increased.

7. The pneumatic tire according to claim 1, wherein, in each of the middle main grooves, the angle formed between the first oblique segment and the second oblique segment is not less than 90 degrees.

8. The pneumatic tire according to claim 7, wherein the depth of each of the middle transverse grooves is in a range of from 50% to 83% of the depth of the middle main groove.

9. The pneumatic tire according to claim 7, wherein the middle land regions are divided into a plurality of middle blocks by the middle transverse grooves, and
the middle blocks include at least one middle block provided with a chamfer at a corner between the first oblique segment and the middle transverse groove.

10. The pneumatic tire according to claim 7, wherein the first oblique segment includes an arc-shaped part curved so that its axially outward inclination toward the opposite direction to the rotational direction is increased.

11. The pneumatic tire according to claim 1, wherein the depth of each of the middle transverse grooves is in a range of from 50% to 83% of the depth of the middle main groove.

12. The pneumatic tire according to claim 11, wherein the middle land regions are divided into a plurality of middle blocks by the middle transverse grooves, and
the middle blocks include at least one middle block provided with a chamfer at a corner between the first oblique segment and the middle transverse groove.

13. The pneumatic tire according to claim 1, wherein the middle land regions are divided into a plurality of middle blocks by the middle transverse grooves, and
the middle blocks include at least one middle block provided with a chamfer at a corner between the first oblique segment and the middle transverse groove.

14. The pneumatic tire according to claim 1, wherein the first oblique segment includes an arc-shaped part curved so that its axially outward inclination toward the opposite direction to the rotational direction is increased.

* * * * *